US006477963B1

United States Patent
Weule et al.

(10) Patent No.: US 6,477,963 B1
(45) Date of Patent: Nov. 12, 2002

(54) APPARATUS AND METHOD FOR STEERING A GUIDEWAY VEHICLE

(75) Inventors: Christian Weule, Baden (AT); Ralf Krause, Hanau (DE); Jeffrey J. Schwalm, Holbrook, PA (US); Holger Strubelt, Frankfurt (DE); William Cooper, Monroeville, PA (US)

(73) Assignee: Bombardier Transportaion GmbH (DE)

( * ) Notice: Subject to any disclaimer, the term of this patent is extended or adjusted under 35 U.S.C. 154(b) by 0 days.

(21) Appl. No.: 09/936,374
(22) PCT Filed: Mar. 10, 2000
(86) PCT No.: PCT/US00/06365
  § 371 (c)(1),
  (2), (4) Date: Feb. 20, 2002
(87) PCT Pub. No.: WO00/53480
  PCT Pub. Date: Sep. 14, 2000

Related U.S. Application Data
(60) Provisional application No. 60/123,965, filed on Mar. 12, 1999.

(51) Int. Cl.⁷ ............................................. B61B 12/00
(52) U.S. Cl. ...................... 104/243; 104/247; 105/72.2; 180/401
(58) Field of Search ................................ 104/247, 304, 104/242, 243, 245, 246; 105/3, 4.4, 72.2; 180/400, 401

(56) References Cited

U.S. PATENT DOCUMENTS

| | | | | |
|---|---|---|---|---|
| 3,796,165 | A | 3/1974 | Goode | 104/247 |
| 3,921,466 | A | 11/1975 | Allsup, Jr. | 74/110 |
| 4,089,272 | A | 5/1978 | Schmitz | 104/247 |
| 4,105,086 | A | 8/1978 | Ishii et al. | 180/79 |
| 4,183,304 | A | 1/1980 | Forster | 104/247 |
| 4,223,611 | A | 9/1980 | Dawson et al. | 104/247 |
| 4,265,180 | A | 5/1981 | Uozumi | 104/247 |
| 4,274,338 | A | 6/1981 | Uozumi | 105/144 |
| 4,299,172 | A | 11/1981 | Dawson | 104/247 |

*Primary Examiner*—Mark T. Le
(74) *Attorney, Agent, or Firm*—Webb Ziesenheim Logsdon Orkin & Hanson, P.C.

(57) ABSTRACT

A steering apparatus is provided for use on a transit vehicle (10) which includes separate steerable drive tires (45, 50) intended to follow the contour of a guide rail (20). An adjustable linkage (80) transmits the motion of a guide frame (65) following a guide rail (20) to the steerable drive tires (45, 50) and positions the linkage (80) to provide the proper slip angle to the steerable drive tires (45, 50).

17 Claims, 5 Drawing Sheets

US 6,477,963 B1

APPARATUS AND METHOD FOR STEERING A GUIDEWAY VEHICLE

This application is a 371 of PCT/US00/06365 filed Mar. 10, 2000.

BACKGROUND OF THE INVENTION

1. Field of the Invention

This invention relates to steering mechanisms for vehicles. More particularly, it relates to an apparatus and method for steering a vehicle to follow a track or guideway.

2. Description of the Prior Art

Vehicles adapted to travel on a guideway having a guide rail extending parallel to the desired course of the vehicle typically employ a guide frame with guide wheels to track the path of the guide rail and to turn steerable drive tires on the vehicle to follow the guide rail. However, when the vehicle travels along a curve on the guideway, it is not sufficient merely to align the steerable drive tires exactly along the curvature of the guideway. If this is done, the centrifugal forces and the scrub forces due to drive tire misalignment associated with turning the vehicle will be taken by the guide wheels. This phenomenon may be addressed relatively easily for a vehicle traveling in only one direction by adjusting the orientation of the steerable drive tires to compensate the centrifugal force by introducing lateral forces on the drive tires. However, as will be explained further, the compensation of the front steerable drive tire is different than the compensation of the back steerable drive tire. A steering apparatus modified for travel in one direction would not operate efficiently for travel in the opposite direction.

As a result, without any adjustment of the front and rear steerable drive tires, the guide frame cannot deviate from the predetermined curvature of the guide rail, and the guide frame forces the vehicle to travel along the predetermined path of the guide rail.

Furthermore, without any adjustment of the front and rear steerable drive tires, the guide frame must be designed not only to turn the steerable drive tires but also to tolerate centrifugal forces necessary to force the vehicle to turn. As a result, the forces transmitted upon the guide rail through the guide frame are excessive and larger structural elements are required in the fabrication of these parts.

To relieve these excessive forces on the guide frame, it is necessary to adjust the direction of the steerable drive tires to track parallel to the guideway without excessive forces upon the wheels. To do this, the steerable drive tires must be turned beyond the tangential orientation of the rail curvature.

U.S. Pat. No. 4,089,272 teaches a vehicle guidance apparatus which maintains the drive tires in a position parallel to the guide rail. As a result, all of the lateral forces produced when the vehicle turns are transmitted to the guide wheels.

U.S. Pat. No. 4,299,172 entitled "Steering Sense Reversing Mechanism for Guided Vehicles" illustrates a passive steering system with guide frames extending from the front and rear ends of the vehicle to orient the steerable drive tires properly relative to a guideway. This passive system compensates for the forces tending to laterally displace the vehicle whether the vehicle is traveling in the forward or rearward direction.

A design is needed which may easily position both the front and rear steerable drive tires of a vehicle following a guide rail in the proper orientation to account for the radial drift associated with steerable drive tires when the vehicle turns.

SUMMARY OF THE INVENTION

The invention is directed to a steering apparatus for a vehicle adapted to travel on a guideway having at least one guide rail extending parallel to the desired course of the vehicle. The vehicle rests upon a support frame secured to a wheel assembly. The wheel assembly has a guide frame adapted to pivot about a guide frame pivot point such that a guide frame longitudinal axis remains parallel to the guide rail when the guide frame is following a straight portion of the guide rail and remains tangential to the guide rail when the guide frame is following a. curved portion of the guide rail. The wheel assembly further includes a first steerable drive tire hub connected to a first axle which is supported by the support frame and pivotable about a pivot for turning the tire. The steering apparatus comprises a steering linkage connecting the guide frame to the first steerable drive tire hub of the wheel assembly for turning the first steerable drive tire parallel to the guide rail when the guide frame is following a portion of the guide rail that is straight and for turning the first steerable drive tire tangential to the guide rail when the guide frame is following a portion of the guide rail that is curved, thereby defining a neutral steering angle between a longitudinal axis extending through the tire and a central longitudinal axis extending through the vehicle body. The apparatus is further comprised of an actuator for amplifying or reducing the motion of the steering linkage when the guide frame pivots along a curved guide rail by introducing a compensation angle to the neutral steering angle thereby producing an adjusted steering angle to account for a slip angle of the steerable drive tire.

The invention is also directed toward a vehicle having the subject steering apparatus.

BRIEF DESCRIPTION OF THE DRAWINGS

The invention, along with the object and the advantages thereof, will be more apparent upon consideration of the following detailed description read in conjunction with the accompanying drawings in which.

DETAILED DESCRIPTION OF THE INVENTION

Figure 1:
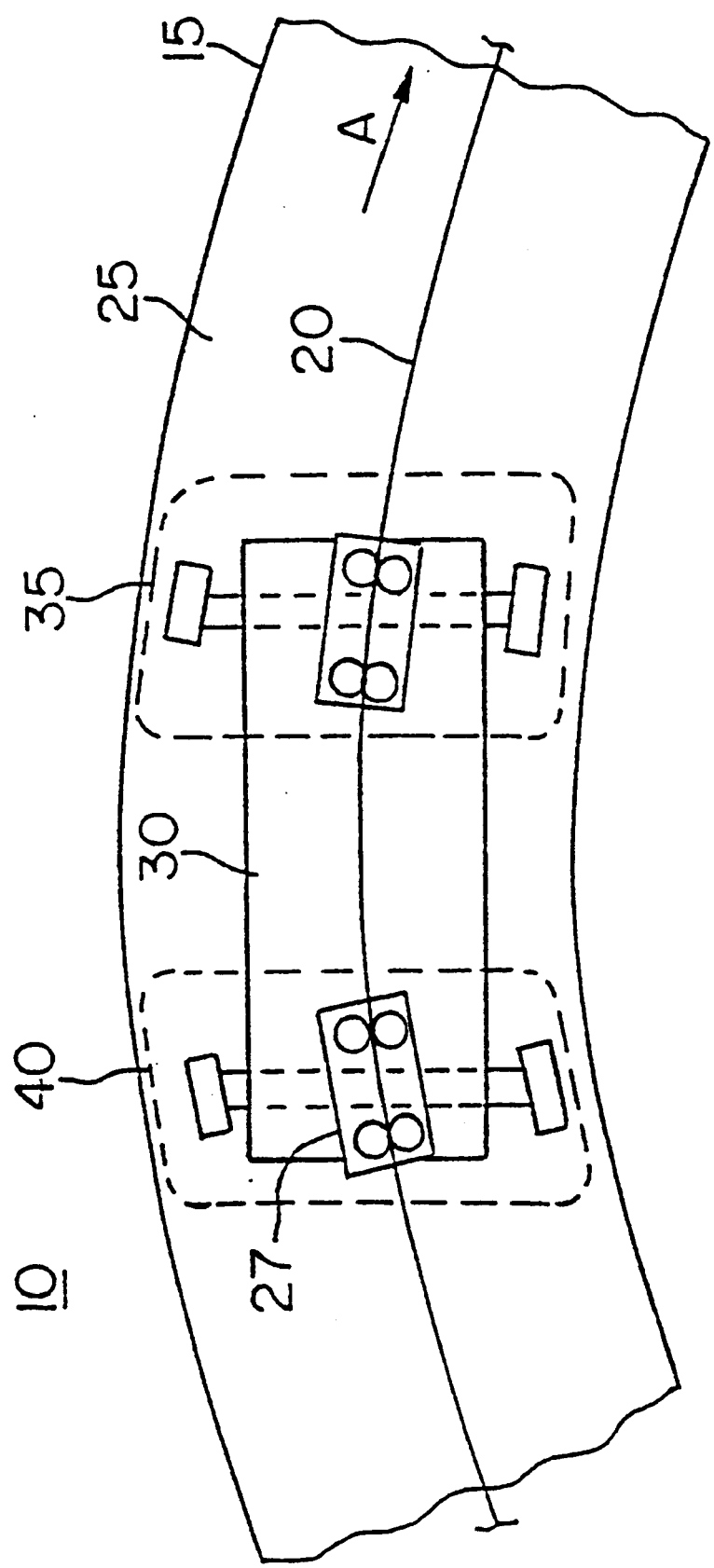
FIG. 1 shows a generalized schematic of a vehicle following a guideway.

FIG. 1 illustrates a transit vehicle 10 which travels along a guideway 15 following a guide rail 20 on a road surface 25 in the direction of arrow A. The transit vehicle 10 has a vehicle body 30 having a front wheel assembly 35 and a rear wheel assembly 40.

Figure 2:
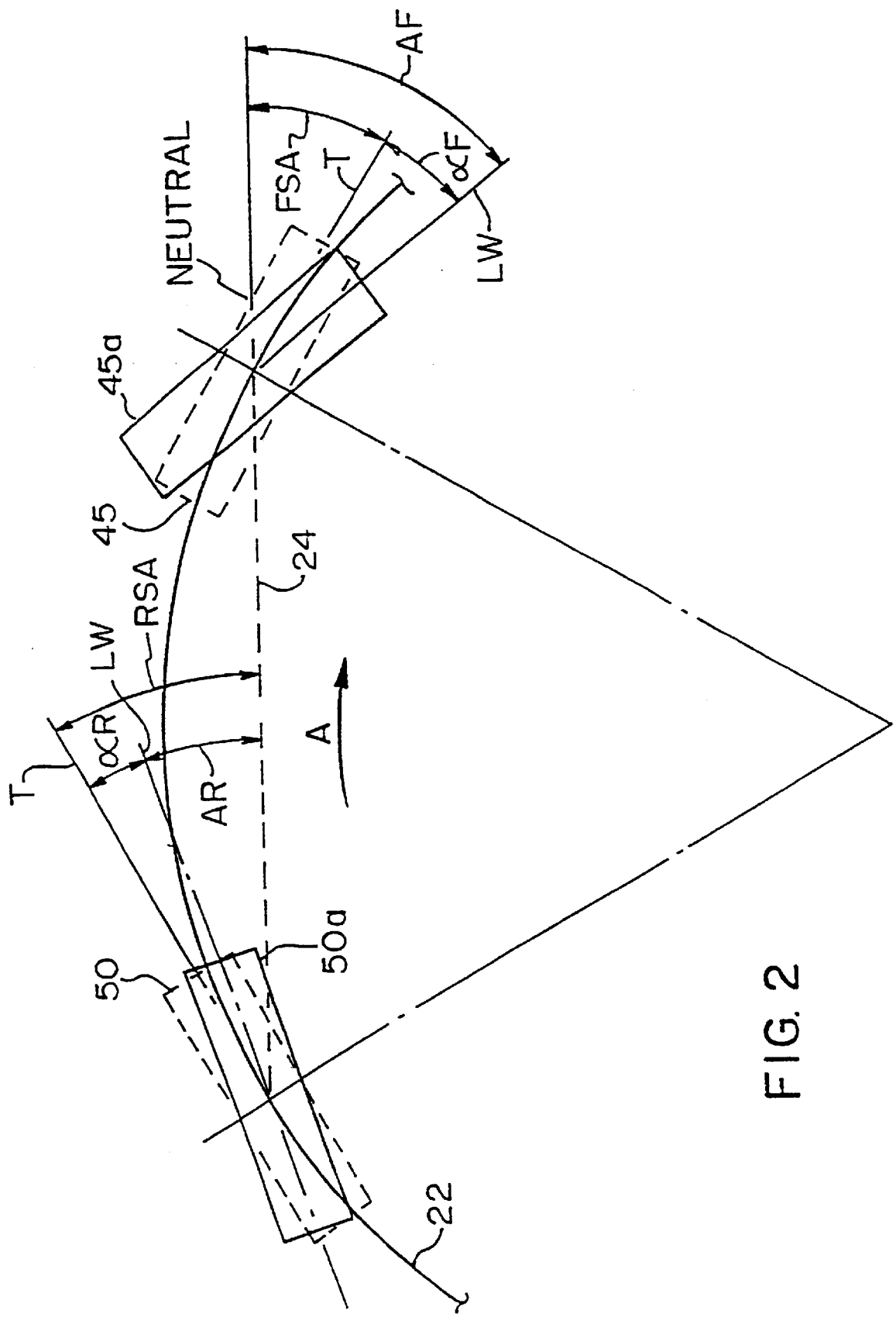
FIG. 2 illustrates a schematic to assist in explaining the concept of a slip angle and steering angle.

For illustrative purposes, FIG. 2 shows, in phantom, one steerable drive tire 45 of the front wheel assembly 35 (FIG. 1) and one steerable drive tire 50 of the rear wheel assembly 40 illustrated in FIG. 1. Superimposed over the steerable drive. tires 45, 50 is line 22 which follows the guide rail 20 showing the ideal path the steerable drive tire should follow. The steerable drive tires 45, 50 are traveling in the direction of arrow A and are illustrated as tangential to line 22. For that reason, steerable drive tire 45 will be referred to as the first steerable drive tire and steerable drive tire 50 will be referred to as the second steerable drive tire with the understanding these descriptions will change if the vehicle direction changes opposite to that shown by arrow A.

Throughout the discussion reference will be made to steerable drive tires with the understanding these tires rotate about tire hubs and any linkages attached to the drive tires are in actuality connected to the associated drive tire hubs.

The steerable drive tires 45, 50 will be rotated and can deviate from their tangential positions. When rotated, they will be referred to as steerable drive tires 45a, 50a. The steerable drive tires 45a, 50a will be shown in solid lines.

In the absence of any lateral centrifugal force, the steerable drive tires 45, 50, illustrated in phantom in FIG. 2, are oriented tangentially to the curvature of the line 22 and will direct the vehicle along the guide rail 20. Centerline 24 in FIG. 2 is a line intersecting the pivot points about which tire 45a and tire 50a rotate.

A line T extends through the center of each of these tires. A steering angle is formed between the centerline 24 and the line T. The steering angle for the first tire 45 is designated as FSA and the steering angle for the second tire 50 is designated as RSA. FSA and RSA will also be referred to as neutral steering angles.

However, the centrifugal forces and the scrub forces due to drive tire misalignment present when the vehicle travels to follow the curvature of the guide rail 20 will cause guide tire forces. To compensate for this, the steerable drive tires 45, 50 are rotated clockwise to positions illustrated by steerable drive tires 45a, 50a. In this orientation, the steerable drive tires 45a, 50a and the vehicle will follow the path of the guide rail 20 with minimum forces transmitted to guide wheels 70 and guide frame 65.

To accomplish this, first steerable drive tire 45 is rotated clockwise from alignment with line T extending through steerable drive tire 45 to the position of steerable drive tire 45a. Steerable drive tire 45a also has a longitudinal axis LW. The angle formed between a tangential line T and longitudinal axis LW of the first steerable drive tire 45a defines a front slip angle $\alpha_F$. In the same fashion, second steerable drive tire 50 is rotated in a clockwise direction to the position indicated by steerable drive tire 50a and the longitudinal axis LW extending through steerable drive tire 50a to define a rear slip angle $\alpha_R$. A more thorough discussion of vehicle steering and the associated slip angles may be found in the textbook entitled *Race Car Vehicle Dynamics*, authored by William F. Milliken and Douglas L. Milliken and published by the Society of Automotive Engineering International in 1995.

It should be noted that relative to centerline 24, the position of first steerable drive tire 45a is defined by the sum of the front steering angle FSA and the front slip angle $\alpha_F$ to form the adjusted front steering angle AF.

Furthermore, the position of the second steerable drive tire 50a relative to the centerline 24 is defined by the difference of the rear steering angle RSA and the rear slip angle $\alpha_R$ to form the adjusted rear steering angle AR. As a result, the first steerable drive tire 45a must be positioned relative to the centerline 24 differently than the second steerable drive tire 50a.

This presents unique problems for bi-directional vehicles.

Figure 3:
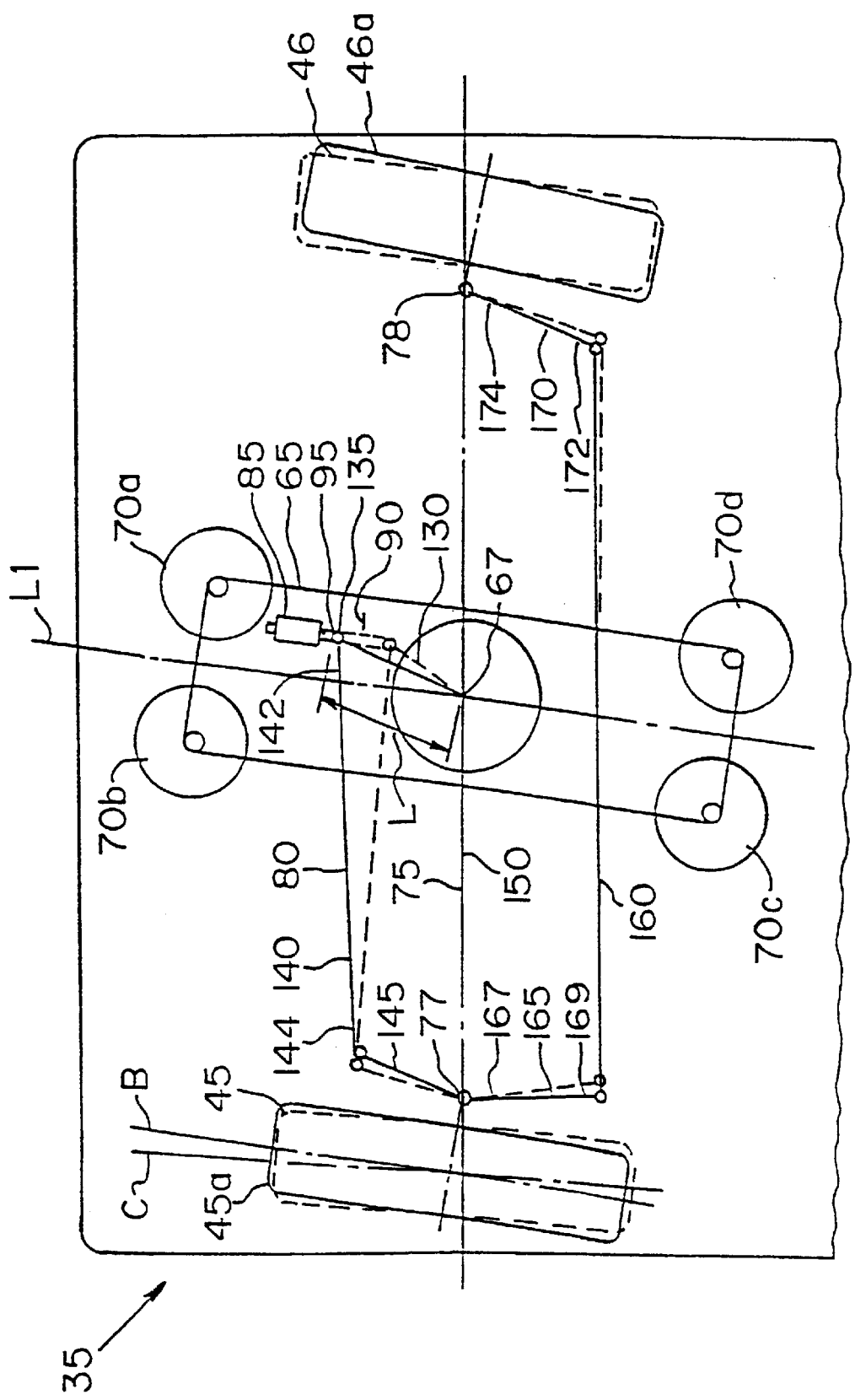
FIG. 3 illustrates a schematic of a linkage in accordance with the subject invention.

Turning to FIG. 3, the front wheel assembly 35 has a first guide frame 65 with guide wheels 70a, b, c, d straddling the guide rail 20 (FIG. 2), which is centrally located upon the guideway 15. An arrangement utilizing such a guide frame is commonly referred to as a central guidance platform.

However, the subject invention may be applied to other guide frame designs such as one with radially protruding guide wheels that engage guide walls on both sides of the guideway. Under these circumstances, the guide rail would be eliminated. Therefore, a guide member for the subject invention may be a guide rail 20 in the center of the guideway 15 or may be guide walls on both sides of the guideway 15.

Returning to FIG. 3, a schematic is illustrated of the steering apparatus in accordance with the subject invention. For purposes of convenience, the guide frame 65 associated with the front wheel assembly 35 illustrated in FIG. 1 will be referred to as the first guide frame 65. The first guide frame 65 is adapted to travel on a guideway 15 having at least one guide rail, such as guide rail 20 in FIG. 1, extending parallel to the desired course of the vehicle 10. The first guide frame 65 is adapted to pivot about guide frame pivot point 67 such that a first guide frame longitudinal axis L1 remains tangential to the guide rail 20 when the guide frame 65 is following a portion of the guide rail 20 that is curved. The front wheel assembly 35 has a front axle 75 with a first steerable drive tire 45 pivotally connected at pivot point 77 to the front axle 75 and with a second steerable drive tire 46 pivotally connected at pivot point 78 to the front axle 75.

The rail vehicle rests upon a support frame secured to the front wheel assembly 35. The vehicle 10 also rests upon a similar support frame (not shown) secured to the rear wheel assembly 40.

The front wheel assembly 35, which is similar to the rear wheel assembly 40, has the first guide frame 65 which is adapted to pivot about the guide frame pivot point 67 such that the guide frame longitudinal axis L1 remains parallel to the guide rail 20 when the guide frame 65 is following a straight portion of the guide rail 20. The guide frame longitudinal axis L1 remains tangential to the guide rail 20 when the guide frame 65 is following a curved portion of the guide rail 20.

A steering linkage 80, when an actuator 85 is in neutral position illustrated by point 90 in FIG. 3, connects the first guide frame 65 to the first steerable drive tire 45 of the wheel assembly 35 for turning the first steerable drive tire 45 parallel to the guide rail 20 when the guide frame 65 is following a portion of the guide rail 20 that is straight and for turning the first steerable drive tire 45 tangential to the guide rail 20 when the guide frame 65 is following a portion of the guide rail 20 that is curved, thereby defining a neutral steering axis as indicated by angle FSA in FIG. 2.

The actuator 85 may be used to amplify or reduce the motion of the steering linkage 80 when the first guide frame 65 pivots along a curved guide rail 20. The actuator 85 introduces a compensation angle to neutral steering angle FSA (FIG. 2) thereby producing an adjusted steering angle AF to account for a slip angle $\alpha$ of the first steerable drive tire 45. The steering linkage 80 also transmits this compensation angle to an opposing first steerable drive tire 46.

The steering linkage 80 includes a guide frame virtual link 130 defined by a radial length L from the guide frame pivot point 67 to an adjustable pivot 135 on the first guide frame 65. Attached to the adjustable pivot 135 is a first end 142 of a steering tire rod 140. The second end 144 of the steering tire rod 140 is pivotally attached to the first steerable drive tire 45 such that rotation of the first guide frame 65 is translated through the motion of the steering linkage 80 directly to rotation of the first steerable drive tire 45. The position of the adjustable pivot 135 determines the magnification or reduction of the steering linkage motion such that the adjusted steering angle AF (FIG. 2) is greater than, equal to or less than the neutral steering angle FSA depending upon the direction of the vehicle 10 traveled. The virtual length of rod 130 between pivot 67 and pivot 135 may vary.

The steering tie rod 140 is pivotally connected to the first steerable drive tire 45 through a steering lever 145.

A four-bar trapezoidal steering geometry extending from the first guide frame 65 to the first steerable drive tire 45 is defined by:
 a) a guide frame virtual link 130 from the guide frame pivot point 67 to the adjustable pivot 135 on the frame 65;
 b) the steering tie rod 140 from the guide frame virtual link 130 pivotally attached to a steering lever 145;
 c) the steering lever 145 from the steering tie rod 140 and fixed to the first steerable drive tire 45; and
 d) a drive tire virtual link 150 from the first steerable drive tire 45 to the guide frame pivot point 67.

The steering apparatus may be further comprised of an opposing first steerable drive tire 46 wherein a drag link 160 translates the rotary motion of the first steerable drive tire 45 to the opposing first steerable tire 46. The first steerable drive tire 45 may have associated with it a first drag link lever 165 which is fixed to first steerable tire 45 at a first end 167 and pivotally connected to the drag link 160 at the second end 169. The drag link 160 is pivotally attached to a second drag link lever 170 at the second drag link lever first end 172 and the second drag link lever 170 is fixed to the opposing first steerable drive tire 46 such that motion of the guide frame 65 is translated to the first steerable drive tire 45 and then to the opposing first steerable drive tire 46. It should be appreciated that, instead of transmitting the rotation of drive tire 45 to drive tire 46 with the drag link. 160, it is also possible and part of this invention to duplicate the steering linkage between the guide frame 65 and the first steerable drive tire 45 in the same way to a steering linkage between the guide frame 65 and the opposing first steerable drive tire 46.

The actuator 85 is illustrated with dotted lines in an extended position in which the radial length L of the guide frame virtual link 130 is minimized thereby reducing the motion of the steering linkage 80. In the second position, illustrated by solid lines in FIG. 3, the length L of the guide frame virtual link 130 is maximized by the actuator 85 thereby magnifying the motion of the steering mechanism.

As previously mentioned, the actuator 85 also has a middle position whereby the steering linkage 80 maintains the steerable drive tire 45 in a neutral position. When the actuator 85 is in the neutral position indicated by line 90, then the first steerable drive tire 45 is positioned tangentially to the curvature of the guide rail 20. By using the actuator 85 to alter the position of pivot point 135, the steering linkage 80 may be slightly altered to orient the drive tire 45 at different angles as illustrated by positions B and C in FIG. 3. These positions may correspond to the positions of tire 45a in FIG. 2. The same rotation applies to tire 46a.

Returning to FIG. 2, the range of angular compensation provided by the. actuator is sufficient to provide angular adjustment to steerable drive tire 45 by adding to the front steering angle FSA the deviation introduced by the front slip angle $\alpha_F$ to produce the adjusted front steering angle AF. In the opposing position, the actuator is capable of providing adjustment to the rear steering angle RSA of the rear drive tire 50 to compensate for the slip angle $\alpha_R$ to provide the adjusted rear steering angle AR.

Returning to FIG. 3, in order to provide distinct positions for adjusting the steering linkage 80, the actuator 85 may be a solenoid which indexes an internal rod 95 of the solenoid to properly position the adjustable pivot 135.

The guide rail 20 illustrated so far in FIGS. 1–3 moves the vehicle 10 to the right as the vehicle 10 travels forward in the direction specified by arrow A. It should be appreciated that if the vehicle 10 traveled along a curve to the left in which the curve had the same radius as the line 22 illustrated in FIG. 2, then the linkage 80 would exaggerate the motion of the steerable drive tires 45, 46 and, for example, first steerable drive tire 45 would be oriented in a similar fashion to second steerable drive tire 50.

The actuator 85 in conjunction with the linkage 80 acts to adjust the degree of exaggeration imparted to the steerable drive tires 45, 46 as a result of rotation of the guide frame 65 following the guide rail 20.

The performance of the actuator 85 should not be limited to providing a set number of distinct positions to the linkage 80 but may provide an unlimited number of positions within a given angular range that cause deviation of the steerable drive tire 50 from the neutral position. Such a device for implementing this arrangement could be provided by, but is not limited to, an actuator 85 which is a pneumatic positioner capable of positioning the linkage in any number of different positions.

Figure 4:
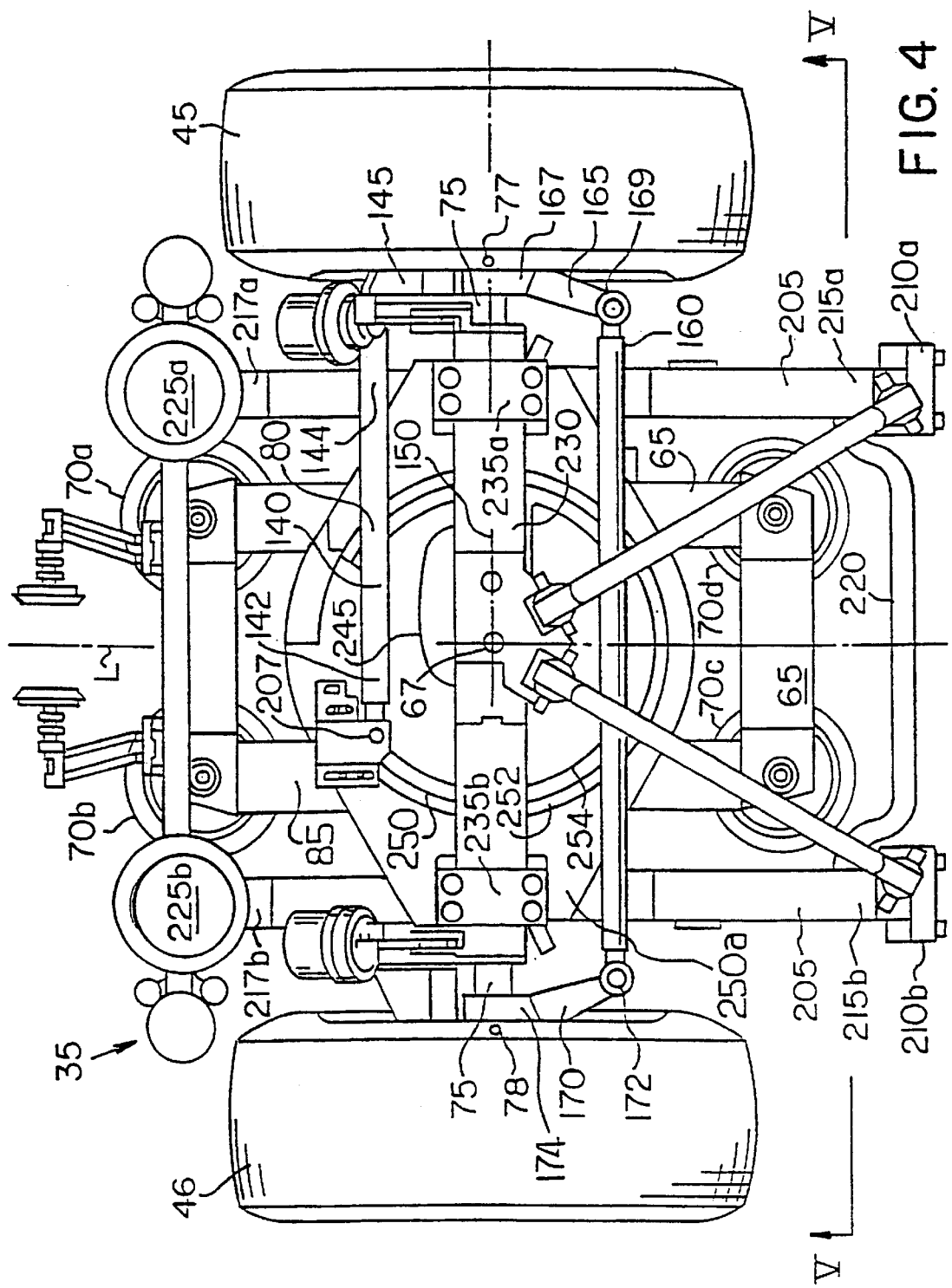
FIG. 4 is a detailed plan view of one embodiment of the subject invention, not illustrating details of the actuator.
Figure 5:
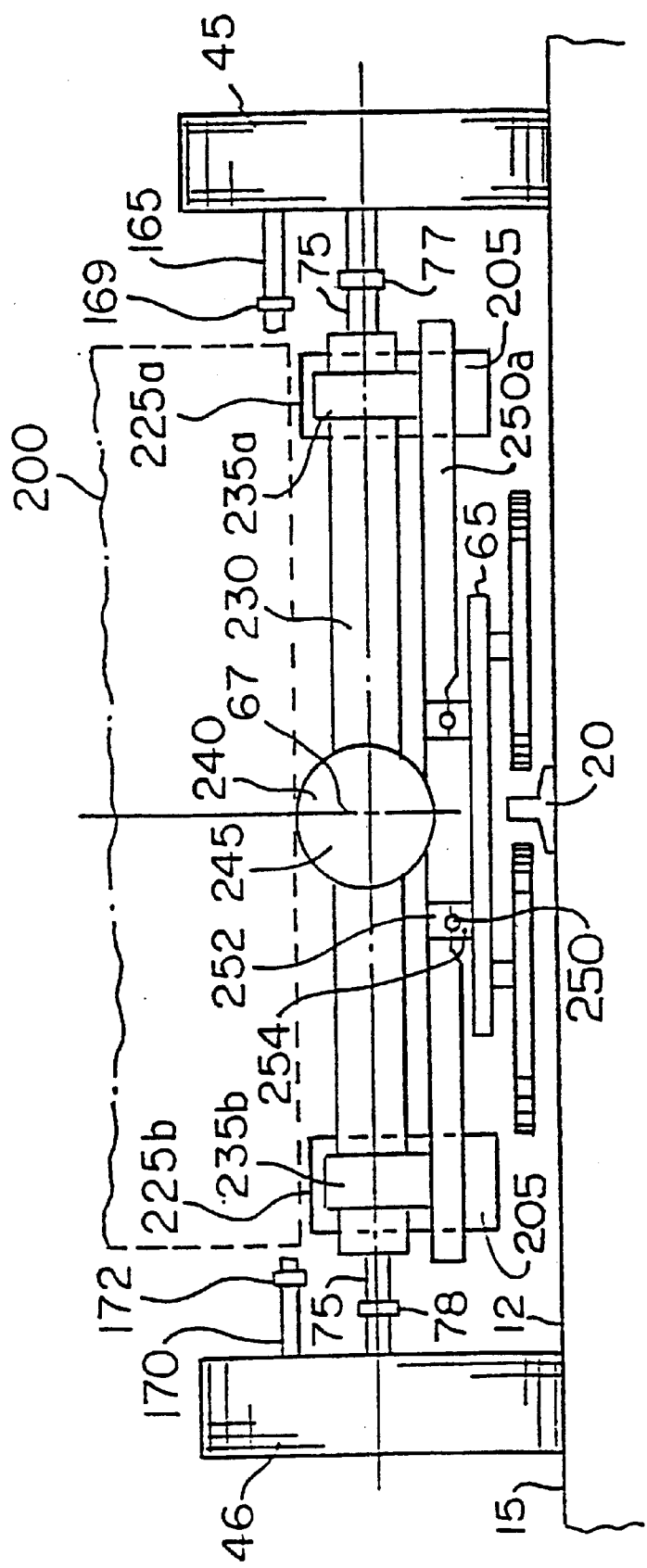
FIG. 5 is an end view along arrows "5—5" in FIG. 4.

The detailed plan view of FIG. 4 and the section view of FIG. 5 of one embodiment of the subject invention illustrate the actual hardware and should be used in conjunction with the previously provided schematics to appreciate the orientation of the elements of the subject invention. Like reference numerals have been added to FIGS. 4 and 5 to make such an identification convenient. The plan view of FIG. 4 and the section view of FIG. 5 do not directly align with the schematic views of FIG. 3. They are a mirror image and should be examined accordingly. As an example, tire 45 is on the left-hand side of FIG. 3 but on the right-hand side of FIGS. 4 and 5. Some elements, however, have not been addressed and the following discussion is addressed to those elements.

Specifically, the transit vehicle body 200 is pivotally connected to a support frame 205 at connections 210a and 210b positioned at ends 215a, 215b of the support frame 205. Cross member 220 provides support to ends 215a, b of the support frame 205. The vehicle body 200 is vertically supported at the other end of the support frame 205 by spring damper systems 225a, b mounted at the support frame second ends 217a, b.

Each axle 75 is driven by a common differential 240 located in a differential housing 245.

The first guide frame 65 is pivotally mounted to the support frame 205 using a ring bearing 250 having a top race 252 mounted to a plate 250a connecting the support frame 205 and a bottom race 254 mounted to the first guide frame 65. The ring bearing 250 is centered about guide frame pivot point 67.

It should be appreciated the actuator 85, schematically illustrated in FIG. 3, is only generally illustrated in FIG. 4 with the understanding that the description associated with FIG. 3 illustrates additional hardware and describes the operation of the actuator 85.

Although this invention has been described with respect to further embodiments, various modifications, revisions and additions will become evident to persons of ordinary skill in the art. All such modifications, revisions and additions are intended to be encompassed in the scope of this invention, which is limited only by the claims appended hereto.

What is claimed is:

1. A steering apparatus for a vehicle adapted to travel on a guideway having at least one guide rail extending parallel to the desired course of the vehicle, wherein the vehicle rests upon a support frame secured to a wheel assembly, wherein the wheel assembly has a guide frame adapted to pivot about a guide frame pivot point such that a guide frame longitudinal axis remains parallel to the guide rail when the guide frame is following a straight portion of the guide rail and remains tangential to the guide rail when the guide frame is following a curved portion of the guide rail, wherein the wheel assembly further includes a first steerable drive tire connected to a first axle which is supported by the support frame and pivotable about a pivot for turning the tire, wherein the steering apparatus comprises:

a) a mechanical steering linkage comprised of a series of links connecting the guide frame to the first steerable drive tire of the wheel assembly for turning the first steerable drive tire parallel to the guide rail when the guide frame is following a portion of the guide rail that is straight and for turning the first steerable drive tire tangential to the guide rail when the guide frame is following a portion of the guide rail that is curved, thereby defining a neutral steering angle between a longitudinal axis extending through the tire and a central longitudinal axis extending through the vehicle body; wherein the length of one of the links is adjustable; and b) an actuator for increasing or decreasing the length of the adjustable link of the steering linkage thereby amplifying or reducing the amount the first steerable drive tire is turned in response to motion of the guide frame when the guide frame pivots along a curved guide rail and thereby introducing a compensation angle to the neutral steering angle and producing an adjusted steering angle to account for a slip angle of the steerable drive tire.

2. The steering apparatus according to claim 1, wherein the adjustable link is a guide frame virtual link defined by a radial length from the guide frame pivot point to an adjustable pivot on the guide frame to which is attached the first end of a steering tie rod, wherein the second end of the steering tie rod is pivotally attached to the first steerable drive tire such that rotation of the guide frame is translated through the steering linkage motion directly to rotation of the first steerable drive tire and wherein the position of the adjustable pivot determines the magnification or reduction of the steering linkage motion such that the adjusted steering angle is greater than, equal to, or less than the neutral steering angle.

3. The steering apparatus according to claim 2, wherein the steering tie rod is pivotally connected to the first steerable drive tire through a steering lever which is fixed to the steerable drive tire.

4. The steering apparatus according to claim 3, wherein a four-bar trapezoidal steering geometry from the guide frame to the first steerable drive tire is defined by:

a) the guide frame virtual link from the guide frame pivot point to the adjustable pivot attached on the guide frame;
   b) the steering tie rod from the guide frame virtual link pivotally attached to a steering lever;
   c) the steering lever from the steering tie rod and fixed to the first steerable drive tire; and
   d) a drive tire virtual link from the first steerable drive tire to the guide frame pivot point.

5. The steering apparatus according to claim 4, further comprised of a second steerable drive tire and wherein a first drag link lever is fixed to the steering lever at a first end and pivotally connected to a drag link at the second end, the drag link is pivotally attached to a second drag link lever and the second drag link lever is fixed to the second steerable wheel such that motion of the guide frame is translated to the first steerable drive tire and then to the second steerable drive tire.

6. The steering apparatus according to claim 2, wherein there are multiple adjustable pivot locations on the guide frame and the attachment of the steering tie rod first end to one of those pivots defines the radial length of the guide frame virtual link.

7. The steering apparatus according to claim 2, wherein the guide frame virtual link has three distinct radial lengths with one length to amplify the motion of the linkage to produce an adjusted steering angle which is the sum of the neutral steering angle and the compensation angle, a second radial length to produce an adjusted steering angle which equals the neutral steering angle and a third radial length to produce an adjusted steering angle which is the difference between the neutral steering angle and the compensation angle.

8. The steering apparatus according to claim 1, wherein the actuator mounted upon the guide frame has a movable rod with an adjustable pivot, wherein the rod may be positioned at any number of different positions thereby providing any number of radial lengths for the guide frame virtual link.

9. The steering apparatus according to claim 8, wherein the actuator is a solenoid.

10. The steering apparatus according to claim 8, wherein the actuator is a pneumatic positioner.

11. The steering apparatus according to claim 1, wherein the actuator fails in a position where the compensation angle is zero.

12. The steering apparatus according to claim 1, wherein the linkage is arranged to provide an Ackermann steering arrangement between the first and second steerable drive tires when the steering linkage is in the neutral steering angle.

13. The steering apparatus according to claim 1, wherein the guide rail is a rail protruding from the guideway and the guide frame has four symmetrically mounted guide tires which straddle and orient the guide frame relative to the guide rail.

14. The steering apparatus according to claim 1, wherein the guide rail is a guideway wall on each side of the guideway and the guide frame has at least two outwardly protruding guide tires on each side of the frame which contact the guideway wall and orient the guide frame relative to the guideway.

15. The steering apparatus according to claim 1 wherein the steering linkage and actuator are associated with a steerable drive tire on a front wheel assembly of the vehicle and further including a second steering linkage and a second actuator associated with a second steerable drive tire on a rear wheel assembly of the vehicle.

16. The steering apparatus according to claim 15 wherein each steering linkage and associated actuator are independent of the other steering linkage and actuator.

17. The steering apparatus according to claim 16 wherein each steering linkage and associated actuator produce an adjusted steering angle for their respective steerable drive tire to account for a slip angle of that steerable drive tire and wherein the steering linkages and actuators may provide the proper slip angle to the respective steerable drive tire whether the vehicle is traveling in a forward or in a reverse direction.

* * * * *